United States Patent Office 3,435,411
Patented Mar. 25, 1969

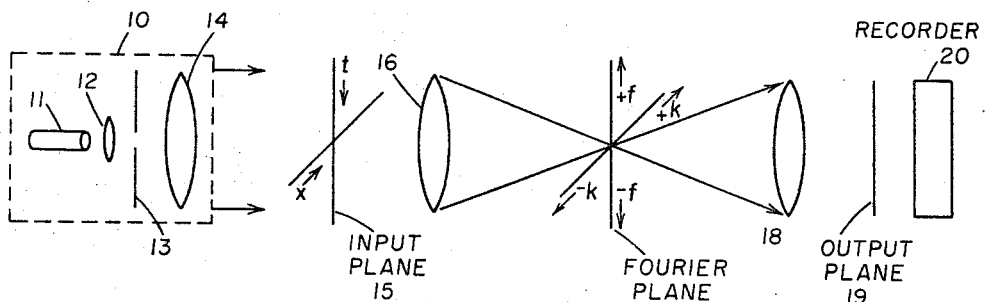
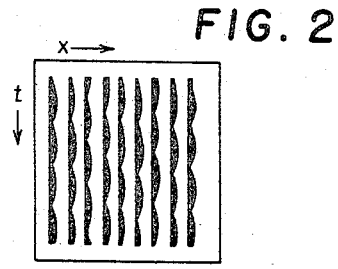
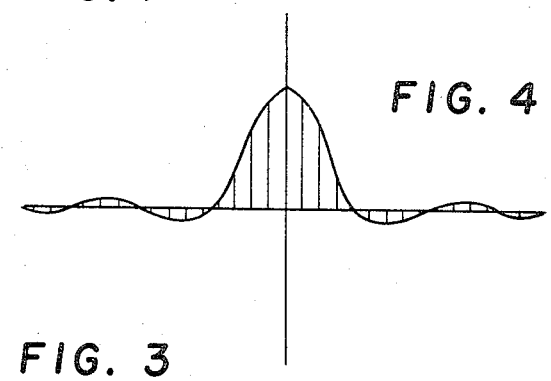
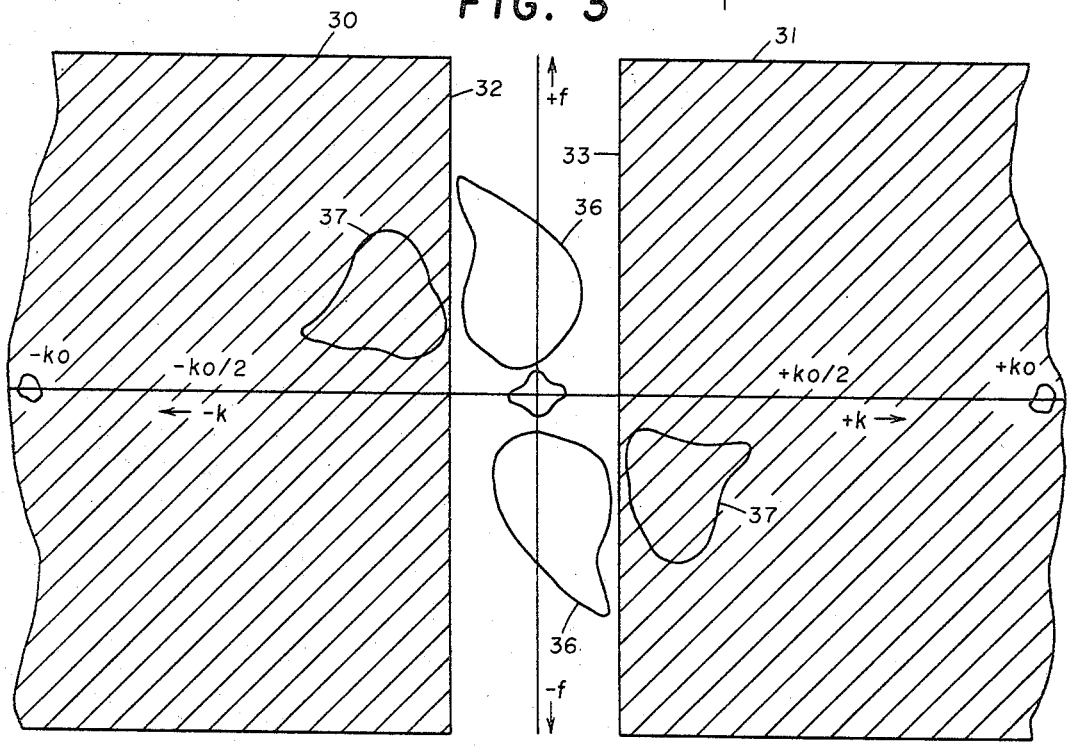

3,435,411
SEISMIC WAVELENGTH FILTERING IN OPTICAL DATA PROCESSING
Philip L. Lawrence, Dallas, Tex., assignor to Mobil Oil Corporation, a corporation of New York
Filed Aug. 29, 1967, Ser. No. 664,116
Int. Cl. G01v 1/00
U.S. Cl. 340—15.5          2 Claims

ABSTRACT OF THE DISCLOSURE

The specification discloses an optical data processing technique for filtering apparent wavelengths on a multi-trace seismic section. In low-pass operations this frequency plane process can be interpreted in terms of weighted trace compositing.

Background of the invention

In optical data processing, the processing of seismic sections has been limited generally to frequency and velocity filtering, the latter of which inherently involves the filtering of frequency. Both of these techniques thus reduce the frequency bandwidth which is undesirable in some cases since a wide frequency bandwidth gives more information. In addition, it has been found that in many cases frequency or velocity filtering will result in loss of signal data.

Summary of the invention

In accordance with the present optical technique, only the wavelengths of a seismic section are filtered or rejected. This allows one to reject noise and enhance signals without loss of data in cases where they have different wavelength ranges. The technique does not band-limit the frequencies in the data thereby preserving more information.

In carrying out the invention there is formed a reduced-size film transparency representative of a seismic section and having a plurality of side-by-side traces extending on said transparency in a given direction. This transparency is inserted into the input plane of an optical computer having, in addition, a transform plane and an output plane. In the input plane, the transparency is positioned such that the traces all extend in a first direction to form a two-dimensional transform of the section in the transform plane having an $f$ axis extending in a direction parallel to the first direction and a $k$ axis extending in a direction perpendicular to the $f$ axis wherein $k$ is the reciprocal of the apparent wavelength of events on the section and $f$ is the apparent frequency. In the transform plane there is inserted opaque members having edges parallel to the $f$ axis to filter only wavelengths from the section. The image formed in the output plane of the computer then is recorded. Trace compositing is obtained by positioning the opaque members whereby their edges lies at some point symmetric about the $f$ axis and between the origin on the transform plane and one half the $k$ transform value for the trace spacing.

Brief description of the drawings

FIGURE 1 illustrates an optical computer for carrying out the present invention;
FIGURE 2 illustrates a variable area transparency of a seismic section;
FIGURE 3 illustrates the transform of a seismic section formed in the transform plane of an optical computer with a low-pass mix or $k$-filter inserted therein; and
FIGURE 4 illustrates a sinc function which is defined as the transform of a square pulse.

Brief description of optical data processing

Referring now to FIGURE 1, there will be described the computer employed for carrying out the invention. The computer shown is of the well-known optical type and comprises a coherent light source 10 including a laser 11, a lens 12, an opaque member 13 with a pin hole and collimating lens 14 for directing coherent light toward an input plane or scene at 15. Another lens 16 is employed for transforming the image in the input plane. The Fourier transform plane is at 17. A second lens 18 is employed for re-transforming the light to form a reconstructed image on an output plane, illustrated at 19, and a recorder 20, the latter of which may comprise a filmholder including photographic film. The input plane 15, lens 16, Fourier plane 17, lens 18, and output plane 19 are aligned and spaced according to well-established optical formulas so that the Fraunhofer diffraction pattern of the input is sharply focused at the Fourier plane and the image of the input is sharply focused at the output plane 19.

In obtaining data for use in the computer, seismic energy is applied to the earth's surface. Events reflected from the subsurface layering are detected at spaced positions along a traverse. These events are recorded to form a seismic section comprising a plurality of spaced traces, each trace representing the variation of the output of each detector with time. The seismic section then is formed into a reduced-size, variable area or a variable density transparency which is representative of the seismic section. FIGURE 2 illustrates a variable area transparency. The traces of this transparency are opaque while the spaces between are transparent. The width of the transparent part varies with the seismic signal. The variable density transparency (not shown) consists of a plurality of equal-width traces with film density varying in accordance with the variation of the seismic signals.

The transparency employed is inserted in the input plane with the traces extending vertically whereby the time ($t$) and distance ($x$) axes are vertical and horizontal, respectively. In the transform plane, for the section position shown, there is a frequency or $f$ axis which is vertical and a $k$ axis which is horizontal. In this connection, frequency is scaled as reciprocal time. The term $k$ is scaled as reciprocal distance or apparent wavelength which is the number of traces required to pass from a given phase on a wave form to the nearest trace having the same phase.

Detailed description of the invention

In accordance with the present invention, wavelengths are filtered or removed from the input data by placing opaque members with straight edges in a position whereby the edges are parallel with the frequency axis (perpendicular with the $k$ axis) and equally spaced with respect to the $f$-$k$ origin. Due to the sharp cutoff of the opaque members, the filter, here employed to filter wavelengths, is defined as a "brick-wall filter" and may be of the low-pass, high-pass, band-pass, or band-stop type. FIGURE 3 illustrates a low-pass wavelength or $k$ filter in the transform plane. It consists of a parallel pair of opaque knife edges or blades 30 and 31 whose inner edges 32 and 33, respectively, are aligned perpendicular to the $k$ axis and spaced at equidistant points from the $f$ axis. All wavelengths shorter than the $k$ number cutoff of the filter (those to the left and right of edges 32 and 33, respectively) are eliminated while those longer than the $k$ number cutoff are passed.

In FIGURE 3, the enclosed areas identified by reference characters 36 represent the transform of signals of subsurface reflections while the enclosed areas identified by reference characters 37 represent the transform of coherent noise having wavelengths shorter than those of the reflections. In this situation, enhancement of the signal-to-noise ratio is obtained by removing with the low-pass filter only noise of lower wavelength which exists to the left and right of edges 32 and 33, respectively. The signals of interest are allowed to pass as well as all of their frequency content.

In the frequency plane, low-pass filtering of wavelengths of the seismic data on a section is equivalent to mixing or compositing traces, in the time domain, using an appropriate sinc function for the convolution operator. It is carried out in the present case by simple multiplication, that is, the transform of the discrete seismic traces is multiplied by the brick-wall filter employed in the transform plane.

For mixing of the discrete traces to take place, however, the cutoff of the filter must fall between zero and one half the $k$ value of the trace spacing. For example, referring to FIGURE 3, the transform of the trace spacing is shown at $k_o$. One half the distance from the origin ($o$) to $k_o$ is shown at $k_o/2$. If the cutoff is at $k_o/2$, there will be no trace compositing but only conversion of variable area traces to a continuous variable intensity section. This is equivalent to having a sinc function, which in the time domain, merely converts sample data into a continuous function. As the $k$-cutoff increases outwardly from the origin beyond $k_o/2$, the equivalent sinc function becomes smaller resulting in no overlapping of traces. With the cutoff located between the origin and $k_o/2$, for example, the position of the edges 32 and 33, the equivalent sinc function includes several traces in the main lobe hence compositing of the traces results. Progressive lowering of the $k$ number cutoff results in the inclusion of more traces in the main lobe of the sinc function. The result is the same as progressively heavier trace compositing using a sinc weighting function.

The sinc function mentioned above is defined mathematically as $$\frac{\sin(nx)}{nx}$$

wherein $x$ is a variable proportional to distance, and
$n$ is the number of traces in the main lobe of the sinc function.

A sinc function is illustrated in FIGURE 4 wherein the vertical lines are illustrative of the traces within the sinc function and the lengths of the lines are indicative of the compositing weights.

The number of traces in the main lobe of the sinc function is a measure of the amount of trace compositing. This can be understood when one considers that an ideal lowpass filter on the $k$ axis performs the same operation as convolving the traces with a sinc weighting function. One needs simply to relate transform parameters to convolution parameters.

In determining the measure of trace compositing, let the distance from the origin of the transform plane to the transform of the trace spacing be $k_o$ as indicated above. Then let the low-pass cutoff be $k_q$. The ratio $k_o/k_q$ is a measure of the number of traces in the main lobe of the sinc mixing operator. It can be shown that this number of traces $n$, is $$n = (k_o/k_q) - 1 \quad (1)$$

The following equation, derived from Equation 1, permits one to determine the brick-wall cutoff for a given $n$.

$$k_q = k_o/(n+1) \quad (2)$$

For example, to obtain eight traces in the main lobe, $k_q$ must be ⅑ of $k_o$. Thus, Equation 2 permits one to determine the brick-wall cutoff for a given trace composite. For example, to determine the cutoff for an eight trace composite, the number eight is substituted for $n$. In an eight trace composite the four traces on each side of a reference position will be mixed forming the output reference trace.

In normal trace compositing, the traces are added with equal weights. In the optical case, however, the trace compositing is weighted with weights dependent upon where the traces fall on the sinc function. Thus, the weighting function for traces in the trace composite equivalent to the brick-wall $k$-filter is determined by the appropriate sinc function. The weights vary smoothly from unity for the center trace, through values of: .91 at the $$\left(\frac{n+1}{8}\right)\text{th}$$

traces from the center; .64 at the $$\left(\frac{n+1}{4}\right)\text{th}$$

traces from the center; .30 at the $$\left(\frac{3(n+1)}{8}\right)\text{th}$$

traces from the center; to zero for the $$\left(\frac{(n+1)}{2}\right)\text{th}$$

traces from the center, for $n$ odd in composites.

For $n$ even, the center pair weights are .98; at the $(n/8)$th traces, .73; at the $(n/4)$th traces, .55; at the $(3n/8)$ traces, .055; at the $(n/2)$th trace, zero. Traces whose positions from the center trace are greater than $n/2$ have positive and negative weights, the largest of which is .21. Generally, these weights will be smaller than 0.1 for all traces in the secondary lobes of the sinc function.

If there are $n$ traces in the center lobe of the sinc function, the brick-wall mix then is approximately a sinc-weighted, $(n-1)/n$ trace composite, ignoring the contributions of the secondary lobes. Here $(n-1)$ is the number of inputs common in adjacent output traces, and $n$ is the number of traces composited.

Optically the operator employed is ideal, not truncated as are practical time-domain mix operators. For this reason, low-pass, brick-wall $k$ filters mix across the whole section, including the gaps between traces and records, converting variable area sections into what are essentially variable intensity sections for heavy mix.

Although the low-pass filter has the most useful applications in the filtering of wavelengths in the optical processing of seismic data, other types of wavelength filters may be employed, such as band-stop, band-pass, and high-pass. The latter three types will be interpretable as different weighted composites based on differences of two sinc functions.

In the optical case, high-pass filters are opaque ribbon pairs positioned to avoid blocking the optical axis. Only the outer edges of the ribbons act as a filter. Band-pass filters require a combination of high- and low-pass devices. Two frequency planes may be utilized, putting ribbons in one and blade edges in the other. Band-stop filters are obtained essentially in the same fashion as are high-pass filters. One simply positions the wire ribbon within the spectrum of the data between the origin and the $k_o2$ locations.

Having described the invention, it will be understood that modifications may suggest themselves to those skilled in the art, and it is intended to cover all those that fall within the scope of the appended claims.

What is claimed is:
1. A method of processing seismic data in an optical computer having an input plane, a transform plane, and an output plane, comprising the steps of:

forming a reduced size light transparency representative of a seismic section and having a plurality of traces side by side extending across said transparency in a given direction, inserting said transparency in said input plane with said traces all extending in a first direction to form a two dimensional transform of said section in said transform plane and having an $f$ axis extending a direction parallel to said first direction and a $k$ axis extending in a direction perpendicular to said $f$ axis wherein: $k$ is the reciprocal of the apparent wavelength of said section and $f$ is the apparent frequency;

in said transform plane inserting opaque members having edges parallel only to said $f$ axis to filter only wavelengths from said section, said members being positioned to locate said edges on each side of the $f$ axis between the origin of said transform and one half the $k$ transform value for the trace spacing for passing wavelengths only between the origin and one half the $k$ transform value, and recording the output produced by said computer.

2. A method of processing seismic data in an optical computer having an input plane, a transform plane, and an output plane, comprising the steps of:

inserting in said input plane a light transparency representative of a seismic section and having a plurality of traces side by side extending across said transparency in a given direction, said transparency being inserted in said input plane with said traces all extending in a first direction to form a two dimensional transform of said section in said transform plane and having an $f$ axis extending a direction parallel to said first direction and a $k$ axis extending in a direction perpendicular to said $f$ axis wherein: $k$ is the reciprocal of the apparent wavelength of said section and $f$ is the apparent frequency;

in said transform plane inserting opaque members having edges parallel only to said $f$ axis to filter only wavelengths from said section, said members being positioned to locate said edges on each side of the $f$ axis between the origin of said transform and one half the $k$ transform value for the trace spacing for passing wavelengths only between the origin and one half the $k$ transform value, and recording the output produced by said computer.

References Cited

UNITED STATES PATENTS 3,274,541   9/1966   Embree _____ 340—15.5

OTHER REFERENCES

Dobrin et al.: "Velocity and Frequency Filtering of Seismic Data Using Laser Light," Conductron Corp., Aug. 25, 1965.

RODNEY D. BENNETT, JR., *Primary Examiner*.

CHARLES E. WANDS, *Assistant Examiner*.